United States Patent
Havens et al.

(10) Patent No.: US 8,261,992 B2
(45) Date of Patent: Sep. 11, 2012

(54) CELLULAR CAMERA PHONE

(75) Inventors: William H. Havens, Syracuse, NY (US); James A. Cairns, Victor, NY (US)

(73) Assignee: Hand Held Products, Inc., Skaneateles Falls, NY (US)

(*) Notice: Subject to any disclaimer, the term of this patent is extended or adjusted under 35 U.S.C. 154(b) by 0 days.

(21) Appl. No.: 13/105,966

(22) Filed: May 12, 2011

(65) Prior Publication Data

US 2011/0212751 A1 Sep. 1, 2011

Related U.S. Application Data

(63) Continuation of application No. 11/904,439, filed on Sep. 27, 2007, now Pat. No. 7,946,493.

(51) Int. Cl.
*G06K 7/10* (2006.01)

(52) U.S. Cl. .............. 235/462.42; 235/472.01

(58) Field of Classification Search ......... 235/462.01–462.25, 472.01–472.03; 348/208.7
See application file for complete search history.

(56) References Cited

U.S. PATENT DOCUMENTS

| | | | |
|---|---|---|---|
| 5,424,524 A | 6/1995 | Ruppert et al. | |
| 5,457,308 A | 10/1995 | Spitz et al. | |
| 5,478,997 A | 12/1995 | Bridgelall et al. | |
| 5,825,006 A | 10/1998 | Longacre et al. | |
| 6,512,919 B2 | 1/2003 | Ogasawara | |
| 6,691,919 B1 | 2/2004 | Katz et al. | |
| 6,947,571 B1 | 9/2005 | Rhoads et al. | |
| 7,195,157 B2 | 3/2007 | Swartz et al. | |
| 7,273,177 B2 * | 9/2007 | Wang et al. | 235/462.25 |
| 7,307,653 B2 * | 12/2007 | Dutta | 348/208.7 |
| 7,609,954 B2 * | 10/2009 | Feng et al. | 396/72 |
| 7,791,814 B2 | 9/2010 | Liogier D'ardhuy et al. | |
| 2005/0001035 A1 | 1/2005 | Hawley et al. | |
| 2005/0056699 A1 | 3/2005 | Meier et al. | |
| 2006/0255149 A1 | 11/2006 | Retter et al. | |
| 2006/0274171 A1 | 12/2006 | Wang | |
| 2007/0041101 A1 | 2/2007 | Goosey et al. | |
| 2007/0063048 A1 | 3/2007 | Havens et al. | |
| 2008/0088756 A1 * | 4/2008 | Tseng et al. | 349/33 |

OTHER PUBLICATIONS

Fowler, C. W. and Pateras, E. S., "Liquid crystal lens review", Dept. of Vision Sciences, Aston University, Aston Triangle, Birmingham, B4 7ET, UK, 1990 Butterworths for British College of Optometrists 0275/5408/90/020186-09, pp. 186 through 194.

Hongwen Ren, Yi-Hsin Lin and Shin-Tson Wu, "Adaptive lens using liquid rystal concentration redistribution", College of Optics and Photonics, Univ. of Central Florida, Orlando Florida 32816, 2006 American Institute of Physics, 0003-6951/2006/88(19)/191116/3, downloaded Mar. 30, 2011 to 199.61.25.254, 3 pages.

Naumov, A. F. and Love, G. D., "Control Optimization of spherical modal liquid crystal lenses",Dept. of Physics and School of Engineering, University of Durham, Sout Road, Durham, DH1 3LE, United Kingdom, Apr. 26, 1999/vol. 4, No. 9/Optics Express, pp. 344-352.

* cited by examiner

Primary Examiner — Thien M Le
(74) Attorney, Agent, or Firm — Hiscock & Barclay, LLP

(57) ABSTRACT

A cell phone includes: a device for wireless communication; an imager sensor for capturing an image of an object; a lens system for projecting an image of the object onto the imager; a battery for powering the cell phone; a lens system for focusing images of the object onto the imager comprising: a focus element; at least two electrodes associated with the focus element; a control system to adjust the state of focus of the focus element by controlling the at least two electrodes.

20 Claims, 9 Drawing Sheets

CELLULAR CAMERA PHONE

RELATED APPLICATIONS

This is a continuation of U.S. patent application Ser. No. 11/904,439 filed Sep. 27, 2007 now U.S. Pat. No. 7,946,493 entitled WIRELESS BAR CODE TRANSACTION DEVICE.

FIELD OF THE INVENTION

The present invention relates to wireless transaction devices, particularly cellular telephones. More particularly, the invention relates to use cellular camera telephones and their uses.

BACKGROUND

Optical bar code readers read data represented by bar code symbols. A bar code symbol is an array of rectangular bars and spaces that are arranged in a specific way to represent elements of data in machine readable form. Optical bar code readers typically transmit light onto a symbol and receive light reflected off of the symbol. The received light is interpreted to extract the data represented by the symbol.

One dimensional (1D) optical bar code readers are characterized by reading data that is encoded along a single axis, in the widths of bars and spaces, so that such symbols may be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. scanning still requires relatively high resolution in one dimension only, but multiple linear scans, or two dimensional scans, are needed to read the whole symbol.

A class of bar code symbologies known as two dimensional (2D) matrix symbologies have been developed which offer greater data densities and capacities than 1D symbologies. 2D matrix codes encode data as dark or light data elements within a regular polygonal matrix, generally accompanied by a graphical finder, orientation, and/or reference structures.

Bar codes are widely used to encode information about goods and services. They are used, either directly or with associated packaging, on an enormous range of goods and products. These include consumer goods such as food and beverage items, personal care products, clothing and apparel, home furnishings, linens, kitchenware, pharmaceuticals, hardware, electronics, appliances, sports and exercise equipment, toys and games, and reading materials. Manufacturing and industrial goods and equipment, including raw (such as felled timber) and finished goods, are also commonly marked directly with, or associated to, bar codes. The codes may contain information including the description of the item, pricing, size, weight, source or manufacturer in short, any desired information that may be captured within the data capacity constraints of the particular bar code symbology being used.

The usefulness of bar codes is not limited to goods and products, but extends to services. Vehicle rental and transportation for hire, such as car rental or leasing and travel by airplane, train, ship, subway, and bus may all be effected through transactions that include the use of bar codes, as may reservation and use of hotel facilities; use of mail, courier, and other package delivery services; rental of lockers and other storage facilities; and event ticketing, such as for movies, concerts, lectures or speeches, plays, seminars, and trade shows. It is, in fact, reasonable to say that any transaction involving an exchange of money for goods or services may be facilitated by use of bar codes, and that many, if not most, such transactions are so facilitated.

Historically the most common use for bar codes in consumer transactions is simply to correlate the item being purchased with its current price, but the potential uses are much broader. When a bar code is scanned at, for example, the checkout counter of a retail store, a simple and direct use of the information in the bar code is to query a store lookup database to retrieve the current pricing of the product in question. A second layer of usefulness may be added by using the bar code information to track store inventory. A third layer might involve using the information for promotional programs, such as triggering printout of coupons based on the items being purchased. If the transaction is of the type where the customer has electronically identified him or herself to the sore, as by using a customer identification card or store issued credit or debit card, the store might also link the items being purchased to the customer's record, and this information could be used for rebates, buying incentive programs, or mailing of targeted promotional materials to the customer, for example.

Until recently, use of bar codes has been largely limited to the vendor. First, there have been few products available to the customer or consumer for capturing and using bar code information. Portable, handheld electronic devices for consumers have been present for many years, such as Personal Digital Assistants (PDAs) and cellular telephones. However, bar code scanning capability has been provided only in dedicated devices that were not aimed at the consumer market, and which generally would have presented a very unfavorable cost/benefit profile for that market. These dedicated scanners are generally quite expensive, and there has simply been no application for their use that would benefit a consumer proportionately to their cost.

BRIEF DESCRIPTION OF THE DRAWINGS

FIG. 3b is a plan schematic view of the fluid lens illustrated in FIG. 3a.

DETAILED DESCRIPTION

Figure 1:
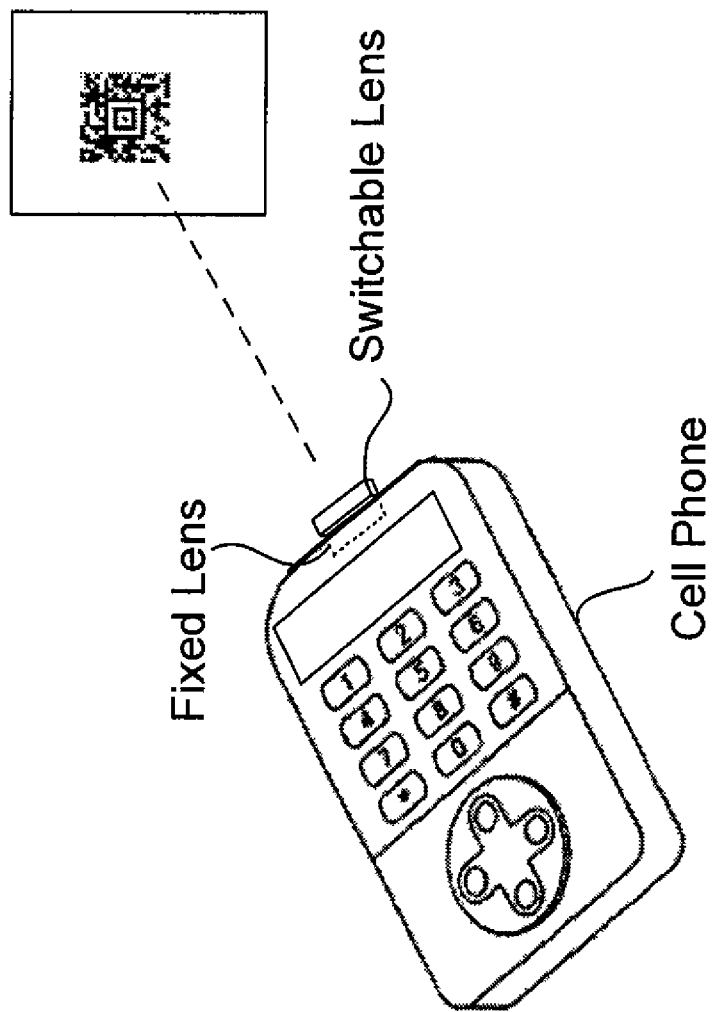
FIG. 1 is a plan view of an exemplary cell phone.

As used herein, terms such as "capturing", "acquiring", and "scanning" a bar code refer to acquisition of the bar code image by a photosensor in the cell phone with sufficient resolution to permit decoding, while terms such as "reading" and "decoding" a bar code refer to processing the image information in order to extract the encoded information.

Cellular camera telephones, also referred to herein for convenience simply as "cell phones", are widely known and used on a global basis. (Use of the phrases "cellular camera telephone" and "cell phone" herein refers to any cellular telephone having the capability to capture a still image.) However, providing a cell phone with the processing circuitry necessary to recognize and decode bar codes would be unlikely to produce a satisfactory device.

In order to quickly and reliably capture a bar code, the cell phone and the bar code should be within a certain distance of each other; the bar code should be within a certain range of angles relative to the optic axis of the cell phone camera; and there must be sufficient illumination falling on the bar code for the cell phone camera system to capture its image. In current camera cell phones, a desired image is generally captured by visually framing the image area in a display provided on the phone. This is a very approximate approach, and would be expected to have an unacceptably high failure rate if used for capturing bar codes, or to require a relatively long 'hold' time after framing the image area in order to provide enough time for the bar code to be located and recognized by the bar code processing circuitry in the cell phone.

The present invention therefore includes providing the cell phone with an aiming or targeting light pattern that is projected from the cell phone onto the bar code, thereby assisting with alignment of the target bar code indicia with the cell phone camera photosensor. The light source for the aiming pattern may be provided by one or more LEDs, or by one of more sources of laser light, such as a laser diode. Mirrors or diffractive elements may be used to shape the initial light output of the aiming source into various aiming patterns as described below. Moreover, the aiming light source may be any of a variety of colors/wavelengths, such as white, red, green, blue, or violet, and may be provided in more than one color, so that the user may select a particular color, or change colors, based on environmental conditions, the specifics of the bar code indicia being scanned, or for esthetic reasons.

Aiming patterns are well known in the bar code scanner art, and may take any form that provides visual guidance to the cell phone user for aligning the bar code indicia with the cell phone optics. The pattern may be limited to the periphery of the image area, such as a complete rectangle, corner brackets, line segments along at least two opposing sides of the image area, or some combination of corner brackets and line segments, all intended to directly mark at least a portion of the periphery of the imaging area. Alternatively the pattern may consist of elements inside the periphery of the imaging area, such as a central "X" or crosshair pattern, which may be of any size ranging from just visible to extending to the periphery; a single central dot; or an array of dots, all intended to suggest or indicate the imaging area. It is also possible to combine peripheral elements with interior elements, such as by having corner brackets and/or line segments on the periphery of the image area combined with a central crosshair or "X" pattern. The peripheral elements and the interior "X" or crosshair pattern may appear as continuous lines, as dashed or dotted elements, or any combination thereof. It is also possible to provide an aiming pattern that has the form of a character, symbol, or image, such as a logo, and this potential may have special importance in cell phones given the relatively high importance given to style in the cell phone market.

While existing cell phones may include light sources for illuminating a target when taking a picture, these light sources generally involve flash illumination. This is inappropriate for scanning bar code indicia for a number of reasons. A flash has a very short duration which might not be sufficient for acquisition of the bar code pattern by the photosensor. In addition, a flash may provide too much illumination, and degrade the contrast needed for reading the bar code indicia by washing out the image or by causing specular reflection. Reading a bar code generally requires less intense illumination, over a longer time period, compared to a camera flash.

Therefore, and similar to the aiming pattern, the cell phone is provided with a bar code illumination source in the form of one or more LEDs, or by one or more sources of laser light, such as a laser diode. As with the aiming source, the illumination source may be provided in a variety of colors, such as white, red, green, blue, or violet, and may be provided in more than one color. This may enable the user to select a particular color, or change colors, based on environmental conditions, the specifics of the bar code indicia being scanned, or for esthetic reasons. In addition, the user or the bar code acquisition function provided in the cell phone may change the illumination color based on ambient lighting conditions and/or the specific bar code indicia being targeted. For example, while red is a common color for illuminating bar codes, it works poorly with the red-on-white bar codes used by the United States Postal Service. Moreover, the aiming source and the illumination source may be the same color, or different colors.

Power management is an important concern with cell phones in order to maximize battery life. For this reason, it is preferred to use a single light source to provide both the aiming pattern and the illumination. This could take the form of a single, steady illumination pattern that serves both to frame or bracket or target the bar code indicia, and to provide sufficient illumination for acquisition of the bar code image by the photosensor. Alternatively, the aiming pattern could take one form and/or be of one intensity, while the illumination function could involve a change in the pattern and/or intensity. Thus, by using one or more buttons or triggers on the cell phone, the user could initially produce an aiming pattern for aligning the bar code indicia, and then trigger a brighter and/or wider field of illumination for actually capturing the bar code. As an example, pressing a first button, or a given button part way, could produce an aiming pattern, and once the target bar code indicia was properly framed, pressing a second button, or pressing the button the rest of the way, could switch to illumination mode, in which the rectangle or crosshair would be replaced or supplemented by a more general and/or brighter field of illumination. The use of a combined aiming and illumination source would be especially suitable for reading 1D bar codes. Alternately the two functions may occur automatically sequentially in time, one after the other after an appropriate delay. This delay may also be programmable such that it may be optimized for different operators and operational environments. The bar code reading functionality may be accomplished with a special button that is readily recognized by the user, such as by being located separate from the other keys on the cell phone; being of a different shape from the other buttons; or bearing some tactile indicia that may be sensed by the user's thumb or finger to confirm that the correct button is being pressed. This might also be integrated with a biometric reader, such as a finger print reader. This would preclude use of the scanning function unless the cell phone was being held by a recognized user.

The illumination system in a cell phone is normally optimized to allow a single flash for each photo being taken, typically with several seconds between flashes. This time between flashes is often used to charge an energy holding element, such as a capacitor, until the second photo is ready to be taken. Often this process forces a minimum time delay between flashes. In a bar code reading application it is often necessary that more than one image be taken in very quick succession, for example with a separation of only 30 ms to 100 ms. This necessitates that the power supply be optimized for this functionality, as is usually the case in a normal bar code scanner.

The power conservation needs of cell cameras would also favor use of less energy intensive decoding algorithms, that is, those which place less demand on the system processor and so consume less energy. For example the decoder may be optimized to decode only the UPC symbology, rather than a full suite of symbologies such as would be the case with a more conventional barcode reading system. Also in a effort to further reduce power consumption, the cell phone functionality may be turned off or disabled during the bar code reading process. The cell phone could have a chameleon aspect enabling it to be customized for different bar code symbologies. Based on a user request or triggered by use conditions, the cell phone could transmit a request for reprogramming to read a certain code or codes, and the necessary programming could be uploaded to the cell phone by wireless connection. Such programming would include not only the decoding algorithm necessary to decode the symbology in question, but also optimization of settings such as aiming, illumination, focal length, and exposure time for capturing and decoding that symbology.

Related to the above, it would be preferable to use a vertical pixel summing approach to acquire and decode the bar code whenever the bar code being read uses a vertically redundant symbology, such as UPC bar codes. The default approach of illuminating, capturing, and decoding information representing the entire image of a 1D bar code is relatively energy intensive in terms of use of memory and/or processing power. Because the information encoded in such bar codes is redundant in the vertical direction, it is possible to obtain a successful read by illuminating and/or capturing only a portion of the bar code, which portion will encompass the full width, but less than the full height, of the code. This may be done stepwise, for example, by first capturing a slice at the bottom of the code, then taking one or more additional slices spaced at vertical increments from the first slice, and summing the data from each slice only until enough information has been gathered to allow decoding. For example, the first horizontal slice might capture the lowermost portion of the code to a height of x pixels, and the next slice would capture a second portion having a height of y pixels, the second slice either overlapping, being immediately vertically adjacent to, or being spaced from, the first slice, and x and y being the same or different. This vertical summing of horizontal slices also significantly improves signal to noise ratio, decreasing the processing time needed to decode the symbol. This could also be accomplished by the use of a 2D imager and summing adjacent or offset rows or columns from the same image.

While remote decoding is possible, where the captured bar code image or a corresponding signal are transmitted to another device for decoding, it is preferred to provide the cell phone with onboard decoding.

The cell phone is also provided with wireless network connectivity, as with one or more of a wireless personal area network (PAN), local area network (LAN), wide area network (WAN), metropolitan area network (MAN), or the Internet. This is to enable carrying out a transaction based on having read one or more bar codes with the cell phone. The connectivity could be accomplished with known technologies such as 802.11(x) or Bluetooth, or even using the cell phone's cellular network connectivity to transfer data by dial-up connection. This connectivity could be used to authorize the transaction desired by the cell phone user, preferably using secure communications procedures. The cell phone user could finish scanning, be presented with a summary of the transaction and associated charges, and authorize or approve the charges, all through the cell phone output and input devices. These could consist of a display and keypad, but could also extend to both speech generation and voice recognition technology. In this way the cell phone could use speech generation to provide a spoken summary of the transaction, and/or use voice recognition to carry out the user's commands.

Much of what has been described herein could also be carried out using Radio Frequency Identification (RFID) technology. In fact, the use of bar code scanning and RFID may be complementary. For example, the user could scan bar codes to create a list of products or services to be purchased, and transfer related information (whether the list itself, a charge amount corresponding to the list, authorization of charges, and so on) by RFID. One example would be purchasing goods in a store by scanning the bar codes associated with each desired item, and completing the transaction by a Smart Card type proximity communication with a retail Point of Sale (POS) terminal. As a specific example, when ordering fast food either in the establishment or in a drive through lane, one could select the desired menu items by scanning associated bar codes; communicate the resulting order to the store system by wireless communication, RFID, or even using one or more resulting bar codes generated by the cell phone, shown on the cell phone display, and presented to a store bar code scanner; and then pay for the order on a "touch-and-go" basis using the cell phone's RFID function.

Related to the above, goods or services may be purchased using any medium capable of displaying a bar code with sufficient resolution to be read by the cell phone. Such media could include electronic displays such as CRT, LCD, and plasma screen, in the form of a computer monitor, television, in store display, electronic billboard, or a portable device such as a PDA or even another cell phone. This could provide additional security over a more conventional RF data link, because only the person scanning the presented bar code is able to record the information, not others also in the vicinity. Bar codes could of course also be read from more conventional printed media, including magazines, newspapers, and coupons, as well as electronic ink displays. The user could shop at home using the Internet to obtain bar codes for desired goods and/or services, either on a monitor or by printout; scan those bar codes using his or her cell phone; and transmit the resulting order, and/or payment authorization, using the cell phone's wireless connectivity, either on the spot or at a later time and/or location.

In addition to completing or carrying out a transaction, the cell phone could be used to generate a list, such as a shopping list. For example, in a residence, as household consumables are used (for example packaged food items, paper goods, personal care items), the bar code on the packaging of the depleted item may be scanned before disposal, creating a list of what has been used and may therefore need replacement. This list could simply be used for future reference, as by being printed out or displayed at a later shopping opportunity. Alternatively, it could be used to generate a transaction request, either remotely (such as from home) or at a retail establishment. The user could transmit the list from home over the Internet using wireless connectivity, RFID, infrared, or any other suitable means to transmit the information from the cell phone to a home computer or similar device with the necessary connectivity to both the cell phone and the Internet or an outside network. That information could be transmitted to a vendor, who might assemble the goods and hold them for pickup, or arrange delivery or shipment to the user as instructed. Alternatively, the user could visit the vendor (grocery store, department store, pharmacy, hardware, etc.) and upload the list to a store system using any of the same connectivity modalities, receiving a printed list for use in shopping, or an assembled order, and could pay for the order using the cell phone after receiving, from the store system, and reviewing, a statement of associated charges.

The cell phone could also enable the user to perform an integrity check on their shopping list, by comparing bar codes stored in the cell phone or on a printed list to items scanned in the store, and showing the user which items had not yet been replaced. Returning to an earlier example, the user could create a list of items to be acquired in the cell phone memory, as by scanning items before disposal, uploading a shopping list including corresponding bar code information to the cell phone, or otherwise; and scan items at the store before placing them in a cart, with the cell phone tracking actual purchases against the saved list. The saved list could also interact with a store network, such as by guiding the user to the locations of desired items using the cell phone display, whether by using a graphical representation of the store layout, by aisle references, or in some other suitable manner. The cell phone could also generate a bar code using its own display, which the shopper could use, for example, by using an in store terminal or price checker kiosk, which would read the bar code on the cell phone display and perform any of a number of functions, including directing the item represented by the bar code to be provided to the customer, or providing the customer with item related information such as location, price, and/or availability. In a similar fashion the cell phone could present a bar code containing the necessary credit card information allowing the transaction to be completed without the necessity of "swiping" a credit card, such as by scanning of the cell phone presented bar code with the store's bar code scanner.

An exemplary embodiment is directed to apparatus and methods useful for imaging, capturing, decoding and utilizing information represented by encoded indicia such as bar codes (for example, 1D bar codes, 2D bar codes, and stacked bar codes), optically recognizable characters (for example printed, typed, or handwritten alphanumeric symbols, punctuation, and other OCR symbols having a predefined meaning), as well as selected graphical images such as icons, logos, and pictographs. The apparatus and methods involve the use of one or more fluid lens and or liquid crystal lens components with data readers such as hand held bar code readers to accomplish such tasks as imaging barcodes and other optically readable information, including focusing on images of interest, and improving image quality by removing artifacts such as jitter introduced by a user who is manually operating a reader of the invention.

The optics systems of camera cell phones are generally designed to take pictures at a range of perhaps three feet to infinity, while a bar code is usually scanned at a range of only several inches, such 3 or 4 to 7 or 8 inches. For this reason it is necessary to either provide a separate set of optics for the bar code scanning capability, which would add cost, or to enable the optics to change focus between the 'normal' range of three feet to infinity, and a closeup range for bar code scanning. This could be accomplished with conventional zoom lens/autofocus technologies. Alternatively, the cell phone may be provided with a switchable lens assembly, such as a fixed lens and one or more secondary lenses that may be superimposed over the fixed lens to change focal range (see FIG. 1). In addition, the cell phone could be provided with fluid/dynamic lens technology, or with liquid crystal lens technology, either by itself or in combination with conventional or fluid lenses, whereby application of voltage to the liquid crystal changes the refractive index, and therefore the focusing power, of the lens. With regard to fluid lens technology, reference is made to U.S. Provisional Patent Application Ser. Nos. 60/717,583; 60/725,531; and 60/778,569, which are hereby incorporated in their entireties by reference thereto. With regard to liquid crystal lenses, reference is made to "Change of focus for liquid crystals", physicsweb, 19 May 2006 (http://physicsweb.org/articles/news/10/5/12/1), which itself references Appl. Phys. Lett. 88 191116; "Control optimization of spherical modal liquid crystal lenses", Optics Express, Vol. 4, Issue 9, pp. 344-352 (April 1999) and the references cited therein; A. F. Naumov, M. Yu. Loktev, I. R. Guralnik, and G. V. Vdovin. "Liquid crystal adaptive lenses with modal control," Opt. Lett. 23:992-994 (1998); "Liquid Crystal Lenses", University of Durham (UK) Astronomical Instrumentation Group (http://www.cfai.dur.ac.uk/fix/projects/lenses/lenses main.html); and Hands, J. W. Philip, Kirby, Andrew K., and Love, Gordon D., "Adaptive modally addressed liquid crystal lenses", Proc. SPIE. 5518: 136-143 (2004) and references cited therein; all the foregoing being hereby incorporated in their entireties by reference thereto.

Figure 2:
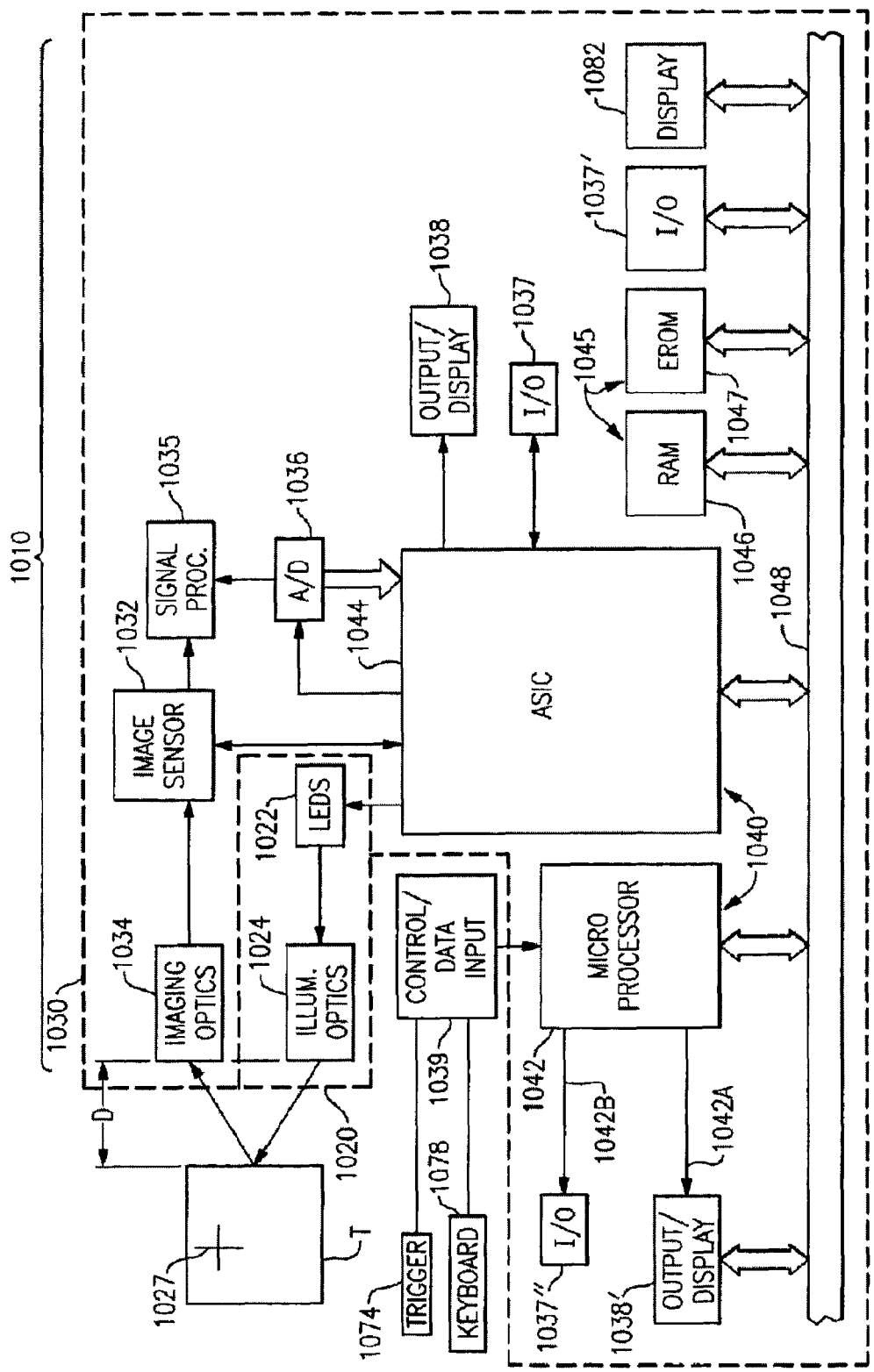
FIG. 2 is a block diagram of an optical reader showing a general purpose microprocessor system that is useful with various embodiments of the invention.

FIG. 2 is a block diagram of an optical reader showing a general purpose microprocessor system that is useful with various embodiments. Optical reader 1010 includes an illumination assembly 1020 for illuminating a target object T, such as a 1D or 2D bar code symbol, and an imaging assembly 1030 for receiving an image of object T and generating an electrical output signal indicative of the data optically encoded therein. Illumination assembly 1020 may, for example, include an illumination source assembly 1022, together with an illuminating optics assembly 1024, such as one or more lenses, diffusers, wedges, reflectors or a combination of such elements, for directing light from light source 1022 in the direction of a target object T. Illumination assembly 1020 may comprise, for example, laser or light emitting diodes (LEDs) such as white LEDs or red LEDs. Illumination assembly 1020 may include target illumination and optics for projecting an aiming pattern 1027 on target T. Illumination assembly 1020 may be eliminated if ambient light levels are certain to be high enough to allow high quality images of object T to be taken. Imaging assembly 1030 may include an image sensor 1032, such as a 1D or 2D CCD, CMOS, NMOS, PMOS, CID OR CMD solid state image sensor, together with an imaging optics assembly 1034 for receiving and focusing an image of object T onto image sensor 1032. The array based imaging assembly shown in FIG. 2 may be replaced by a laser array based scanning assembly comprising at least one laser source, a scanning mechanism, emit and receive optics, at least one photodetector and accompanying signal processing circuitry.

Optical reader 1010 of FIG. 2 also includes programmable control circuit (or control module) 1040 which preferably comprises an integrated circuit microprocessor 1042 and an application specific integrated circuit (ASIC 1044). The function of ASIC 1044 could also be provided by a field programmable gate array (FPGA). Processor 1042 and ASIC 1044 are both programmable control devices which are able to receive, to output and to process data in accordance with a stored program stored in memory unit 1045 which may comprise such memory elements as a read/write random access memory or RAM 1046 and an erasable read only memory or EROM 1047. Other memory units that may be used include EPROMs and EEPROMs. RAM 1046 typically includes at least one volatile memory device but may include one or more long term nonvolatile memory devices. Processor 1042 and ASIC 1044 are also both connected to a common bus 1048 through which program data and working data, including address data, may be received and transmitted in either direction to any circuitry that is also connected thereto. Processor 1042 and ASIC 1044 differ from one another, however, in how they are made and how they are used. The processing module that is configured to extract information encoded by the encoded indicium employs some or all of the capabilities of processor 1042 and ASIC 1044, and comprises the hardware and as necessary, software and or firmware, required to accomplish the extraction task, including as necessary decoding tasks to convert the raw data of the image to the information encoded in the encoded indicium.

Figure 3A:
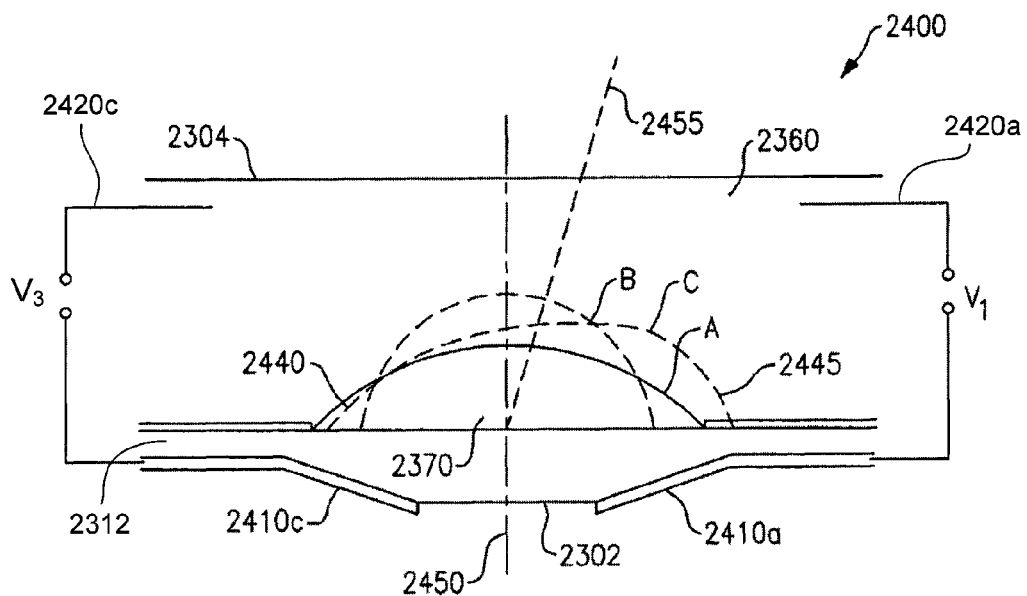
FIG. 3a is a cross sectional diagram showing an embodiment of a fluid lens configured to allow adjustment of a focus and direction of an optical axis.

With regard to fluid lens technology, FIG. 3a is a diagram 2400 of an exemplary fluid lens for focusing on images that is described as operating using an electrowetting phenomenon. The fluid lens 2400 is a substantially circular structure. The fluid lens comprises transparent windows 2302, 2304 on opposite sides thereof. In FIG. 3a, a drop of conductive fluid 2360 (such as water), possibly including dissolved electrolytes to increase conductivity, or to adjust the density of the conductive fluid to match the density of another fluid 2370 that is immiscible with the conductive fluid (such as oil), is deposited on a surface, such as a window. A ring 2410 made of metal, covered by a thin insulating layer 2312 is adjacent the water drop. A voltage difference is applied between an electrode 2420 (that may also be a ring) and the insulated electrode 2410, as illustrated by the battery V. In some embodiments, an insulating spacer (not shown) is located between the rings 2410 and 2420. The voltage difference modifies the contact angle of the liquid drop. The fluid lens uses two isodensity immiscible fluids; one is an insulator (for example oil) while the other is a conductor (for example water, possibly with a salt dissolved therein), which fluids touch each other at an interface 2440. The variation of voltage leads to a change of curvature of the fluid-fluid interface 2440, which in turn leads to a change of the focal length or power of the lens as a result of the refraction of light as it passes from one medium having a first optical index to a second medium having a second, different, optical index. In the embodiment shown, an optical axis 2450 is indicated by a dotted line lying substantially along an axis of rotation of the fluid lens 2400. Suitable signals to the rings 2410 and 2420 may cause the curvature of the interface 2440 to change the optical power of the fluid lens, that is its focal length.

The shape of the interface therefore may be changed by the application of external forces so that light passing across the interface may be directed to propagate in desired directions.

An exemplary embodiment uses the principle of altering the interface shape between two fluids and provides another voltage (or other suitable fluid lens control signal) to control an optical tilt of the fluid interface to adjust an entrance optical axis angle or direction relative to the fluid lens. One application of such adjustment of the entrance optical axis angle is to provide a mechanism and method to compensate the angular movement caused by hand jittering or hand motion.

Figure 3B:
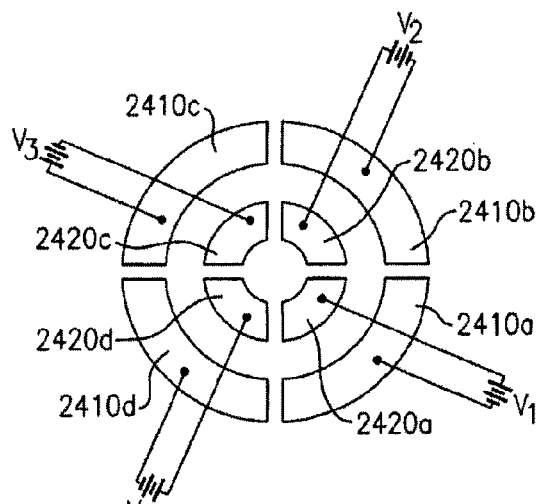

Fluid lens 2400 shows an exemplary embodiment of a fluid lens configured to allow adjustment of an optical axis, and FIG. 3b is a plan schematic view of the same fluid lens. FIG. 3b indicates that the two metal ring electrodes 2410, 2420 have been divided into a plurality of segments, for example four arc pairs (2410a, 2420a), (2410b, 2420b), (2410c, 2420c) and (2410d, 2420d). A plurality of controllable signal sources, such as voltage sources V1, V2, V3, and V4, are provided, such that each controllable signal source may impress a signal on a selected pair of electrodes independent of the signal applied to any other electrode pair. In order to generate a desired curvature of the fluid interface 2440 in the fluid lens 2400, one may control all four voltage controls V1, V2, V3, and V4 to apply a uniform focusing voltage Vf. In order to generate an optical tilt (or to adjust an optical axis of the fluid lens 2400) using the fluid lens of the current invention, in one embodiment, a horizontal tilt voltage dh and a vertical tilt voltage dv are applied on each of the voltages by superimposing the tilt voltages on top of the focusing voltage Vf according to the following equations:

$$V1 = Vf + dv$$

$$V2 = Vf + dh$$

$$V3 = Vf - dv$$

$$V4 = Vf - dh$$

Application of these new signals V1, V2, V3 and V4 creates a two dimensional tilted fluid lens, in which horizontal and vertical tilt angles are determined according to the magnitudes and signs of the control voltages dh and dv. One may generate such signals involving superposition of a signal Vf and an adjusting signal using well known circuits that are referred to as "summing circuits" in analog circuit design, and by using a digital controller such as a microprocessor based controller and a digital to analog converter to generate suitable fluid lens control signals using digital design principles. In FIG. 3a, a fluid lens surface 2445 is shown with a tilt in the vertical dimension caused by application of a signal dv as indicated for V1 and V3. The optical axis 2450 of the undeviated fluid lens is shown substantially along the axis of rotation of the fluid lens, and the deviated or adjusted optical axis is shown by dotted line 2455, which is asymmetric with regard to the axis of rotation. Notice that surface 2445 not only provides focusing curvature to provide a desired optical power of focal length, but also pervades a mechanism to adjust the optical axis to correct for the hand jittering or hand motion. In other embodiments, other applications may be contemplated. As an example, one may set the focal length of the lens to a small value (e.g., operate the lens as a "fisheye" lens that has a wide field of view and great depth of field) and use the adjustment of the optical axis to tip the field of view to bring some feature of interest within the field of view closer to the center of the field of view.

Figure 4:
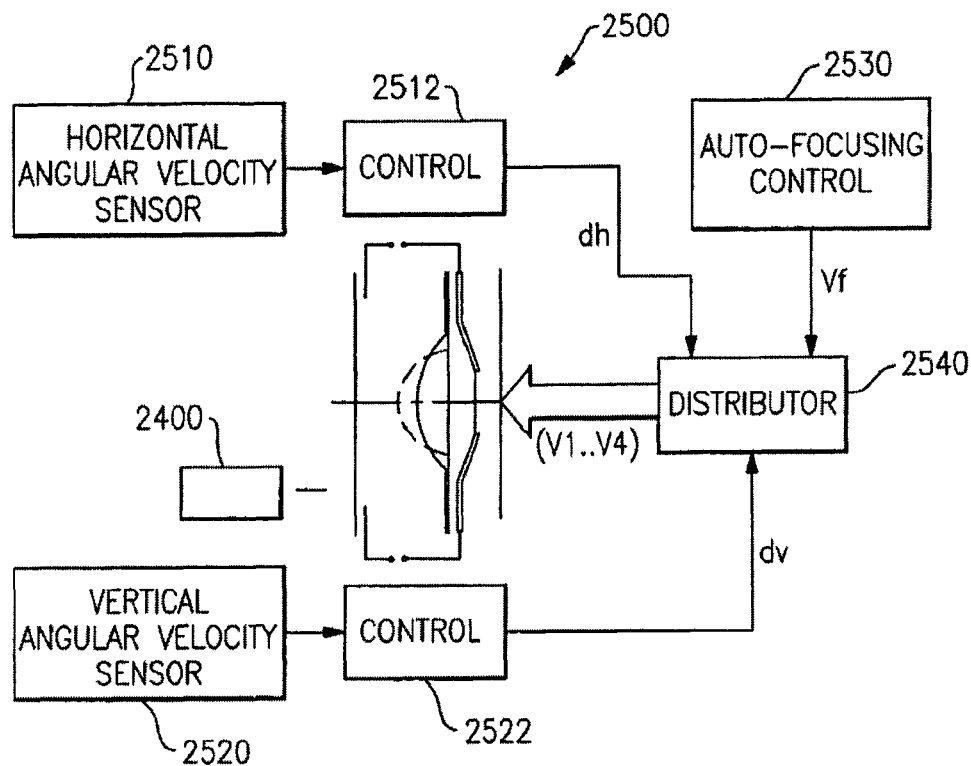
FIG. 4 is a schematic diagram showing the relationships between a fluid lens and various components that allow adjustment of the focus and direction of the optical axis direction.
Figure 5B:
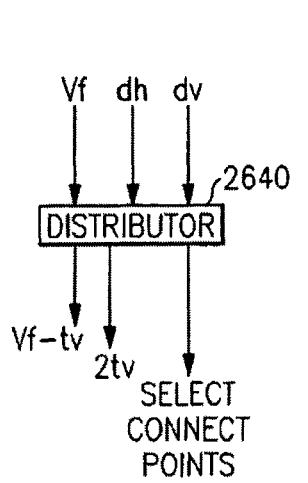
FIG. 5b is a schematic diagram of an alternative embodiment of a distributor module.
Figure 5A:
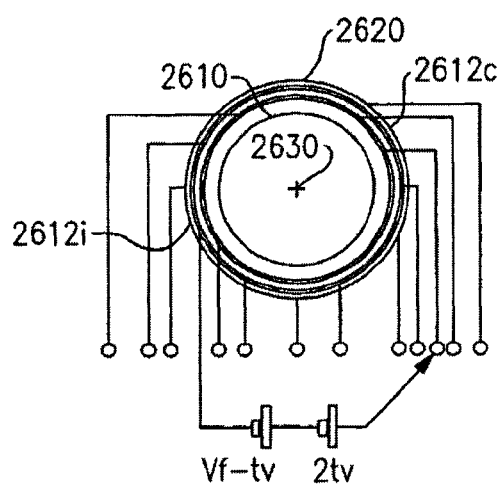
FIG. 5a is a schematic diagram of an alternative embodiment of a fluid lens.

FIG. 4 is a schematic diagram 2500 showing the relationships between a fluid lens and various components that allow adjustment of the optical axis direction. The optical axis control system comprises a horizontal angular velocity sensor 2510, a control module 2512 to generate horizontal tilt voltage dh, a vertical angular velocity sensor 2520, a control module 2522 to generate vertical tilt voltage dv, an auto focusing control module 2530 to generate a focusing voltage Vf, a distributor module 2540 to synthesize the control voltages to control the fluid lens module 2400 to accommodate or to correct for hand jittering.

In some embodiments, the angular velocity sensors 2510 and 2520 are commercially available low cost solid state gyro-on-a-chip products, such as GyroChips manufactured by BEI Technologies, Inc., One Post Street, Suite 2500 San Francisco, Calif. 94104. The GyroChip comprises a one piece, quartz micromachined inertial sensing element to measure angular rotational velocity. U.S. Pat. No. 5,396,144 describes a rotation rate sensor comprising a double ended tuning fork made from a piezoelectric material such as quartz. These sensors produce a signal output proportional to the rate of rotation sensed. The quartz inertial sensors are micromachined using photolithographic processes, and are at the forefront of MEMS (Micro Electro-Mechanical Systems) technology. These processes are similar to those used to produce millions of digital quartz wristwatches each year. The use of piezoelectric quartz material simplifies the sensing element, resulting in exceptional stability over temperature and time, and increased reliability and durability.

In other embodiments, it is possible to divide the two metal rings 2410 and 2420 of FIG. 3 into more than four symmetric arc pairs to create more smooth tilt fluid lens. For example, one of the embodiments may have 12 symmetric arc pairs layout in a clock numeric topology. All the system components shown in FIG. 4 will be the same except that the output of distributor 2540 will have 12 voltage control outputs to drive the 12 arc pairs of the fluid lens module. The voltage synthesis algorithm in distributor 2540 is based on the gradient of a (dh, dv) vector. For example, viewing the fluid lens as if it were a clock, (dh, dv)=(2.5, 0) will have a highest voltage output at a pair of electrodes situated at the 3-o'clock position and the lowest voltage output at a pair of electrodes situated at the 9-o'clock position, and no superimposed voltage would be applied to the electrode pairs nearest the 12-o'clock and 6-o'clock positions. It is possible to interpolate the gradient across any intermediate pairs of electrodes around the circle so as to apply a smoothly varying fluid lens control signal. In principle, one could build a fluid lens with as many electrode pairs as may conveniently be provided. In some embodiments, one of the two ring electrodes may be a continuous ring to provide a common reference voltage for all of the pairs, one element of each pair being the continuous ring, which for example might be held at substantially ground potential, for ease of mounting and assembly, if for no other reason.

Figure 6:
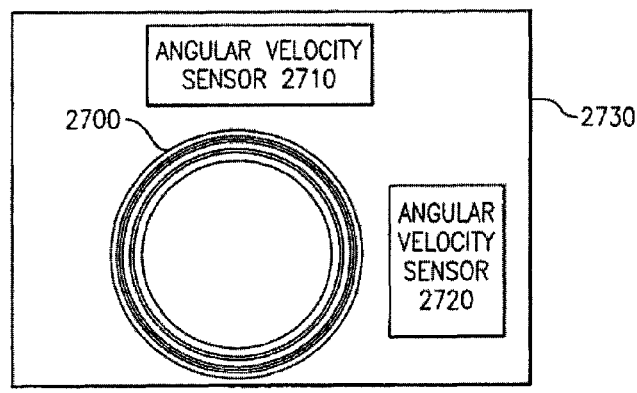
FIG. 6 is a schematic diagram showing the relationship between a fluid lens and a pair of angular velocity sensors, according to principles of the invention.

FIG. 6 is an exemplary schematic diagram showing the relationship between a fluid lens 2700 and a pair of angular velocity sensors. In a preferred embodiment, two of the angular velocity sensors 2710, 2720 may be integrated with the fluid lens 2700 to form an integrated module 2730. The angular velocity sensors 2710 and 2720 are arranged in an orthogonal relationship to detect two orthogonal angular velocities. In some embodiments, the entire control circuitry as shown in FIG. 4 may also be integrated into the module 2730. An advantage of this embodiment is ease of mounting the module 2730. No vertical or horizontal alignments are required. The module will automatically adjust the lens tilt angle according to the output voltages dh and dv provided by the angular velocity sensors 2710 and 2720.

Fluid lens systems that operate using voltage signals as the control signal typically involve a first insulating fluid and a second conductor fluid that are in contact at a contact region and are situated within a dielectric chamber. In one embodiment, the insulating fluid and the conductor fluid are both transparent, not miscible, have different optical indexes and have substantially the same density. In some embodiments, the dielectric chamber naturally has a low wetting with respect to the conductor fluid. In such instances, the location of one or both fluids under conditions of no applied voltage may be controlled using a variety of methods, such as applying a surface treatment, or shaping the walls of the chamber. A surface treatment that increases the wetting of the wall of the dielectric chamber with respect to one of the conductor fluid or the insulating fluid and the chamber wall may serve to define a relative position of an interface between the two fluids.

In an exemplary system, surface treatment is applied to a flat surface comprising the bottom of a container holding the two fluids, and maintains the positioning of a drop of insulating fluid relative to a larger quantity of conducting fluid, preventing the insulating fluid from spreading beyond the desired contact surface. When the system is at rest, the insulating fluid naturally takes a first shape. An optical axis is perpendicular to the contact region between the first and second fluids and passes through the center of the contact region. At rest, the insulating fluid is centered about the optical axis of the device. The elements of the device which are adjacent to the optical axis are transparent. In one embodiment, a transparent first electrode, that transmits light in the vicinity of the optical axis, is placed on the external surface of the wall of the dielectric chamber, on which is situated the insulating fluid. A second electrode contacts the conductor fluid. The second electrode may be immersed in the conducting fluid, or be a conductor deposited on an internal wall of the dielectric chamber. When a voltage V is established between the first and second electrodes, an electrical field is created which, according to the electrowetting principle, changes the wetting properties of the conductive fluid on the bottom surface of the container relative to the nonconductive fluid, so that the conductor fluid moves and deforms the insulating fluid. Because the shape of the interface between the two fluids is changed, a variation of the focal length or point of focus of the lens is obtained.

In the first embodiment, using a device comprising a fluid lens, an image sensor, and a suitable memory, it is possible to record a plurality of frames that are observed using the fluid lens under one or more operating conditions. The device may further comprise a computation engine, such as a CPU and an associated memory adapted to record instructions and data, for example for processing data in one or more frames. The device may additionally comprise one or more control circuits or control units, for example for controlling the operation of the fluid lens, for operating the image sensor, and for controlling sources of illumination. In some embodiments, there is a DMA channel for communicating data among the image sensor, the CPU, and one or more memories. The data to be communicated may be in raw or processed form. In some embodiments, the device further comprises one or more communication ports adapted to one or more of hardwired communication, wireless communication, communication using visible or infrared radiation, and communication employing networks, such as the commercial telephone system, the Internet, a LAN, or a WAN.

In this embodiment, by applying suitable selection criteria, one may use or display only a good frame or alternatively a most suitable frame of the plurality for further data manipulation, image processing, or for display. According to this aspect of the invention, the device may obtain a plurality of frames of data, a frame being an amount of data contained within the signals that may be extracted from the imager in a single exposure cycle. The device may assess the quality of each of the frames against a selection criterion, which may be a relative criterion or an absolute criterion. Examples of selection criteria are an average exposure level, an extremum exposure level, a contrast level, a color or chroma level, a sharpness, a decodability of a symbol within a frame, and a level of compliance of an image or a portion thereof with a standard. Based on the selection criterion, the device may be programmed to select a best or a closest to optimal frame from the plurality of frames, and to make that frame available for display, for image processing, and/or for data manipulation. In addition, the operating conditions for the device may be monitored by the control circuit, so that the conditions under which the optimal frame was observed may be used again for additional frame or image acquisition.

In alternative embodiments, it is possible to use the plurality of frames as a range finding system by identifying which frame is closest to being in focus, and observing the corresponding focal length of the fluid lens. In such an embodiment, the fluid lens may be operated so as to change its focal length over a range of focal lengths, from infinity to a shortest focal length. The device may obtain one or more frames of data for each focal length that is selected, with the information relating to each focal length being recorded, or being computable from a defined algorithm or relationship, so that the focal length used for each image may be determined. Upon a determination of an object of interest within a frame (or of an entire frame) that is deemed to be in best focus from the plurality of frames, the distance from the device to the object of interest in the frame may be determined from the information about the focal length setting of the fluid lens corresponding to that frame. In some instances, if two adjacent frames are deemed to be in suitable focus, the distance may be taken as the average of the two focal lengths corresponding to the two frames, or alternatively, additional frames may be observed using focal lengths selected to lie between the two adjacent frames, so as to improve the accuracy of the measurement of distance.

Exemplary optical lenses with a single static focus may be fabricated in different ways, such as a material of constant refractive index that has been shaped to generate a varying optical path length across the profile of the device. In an alternative exemplary configuration, the device is flat and induces lensing by use of a spatially varying refractive index.

Alternatively, an exemplary variable focusing may be achieved by dynamically changing the refractive index of the medium from which the lens is made. The birefringent properties of liquid crystals and electro-optic crystals may be used to generate this. Liquid crystals are preferred due to their large birefringence and low control voltages. By filling a lens shaped cavity with liquid crystals, and applying a constant voltage across the cell, it is possible to change the refractive index of the medium for incident plane polarized light, thus producing a variable focus lens.

An exemplary uniform thickness adaptive lens device is simpler to manufacture than a lens shaped device and utilizes a spatially varying and controllable refractive index profile. This may be created with a spatially varying and controllable electric potential across a liquid crystal cell. An exemplary electrode structure sandwiches the cell. One exemplary embodiment is to use a pixilated (or zonal) electrode structure. Another example is an acousto-optic lens.

Small aperture liquid crystal micro-lenses may utilize fringing electric fields surrounding very small apertures made in the control electrodes of simple liquid crystal cells and remove the need for pixilated zonal addressing, making the device simpler to manufacture and avoiding the step wise features associated with pixilated devices. The lens profile may be controlled by varying the amplitude of the control voltage.

An alternative exemplary method of generating a lens like voltage profile across a liquid crystal lens is by modal addressing. This also eliminates the need for pixilated electrodes and allows fine tuning of the lens characteristics through simple variation of both frequency and amplitude of the driving voltage. Large focal ranges are therefore achievable, together with a wide possible range of lens apertures.

Modal addressing uses a simple electrode structure to generate a quasi-parabolic and circularly symmetric voltage profile across the profile of a liquid crystal cell. This in turn causes the phase profile of the transmitted light to resemble a spherical lens shape.

Figure 7A:
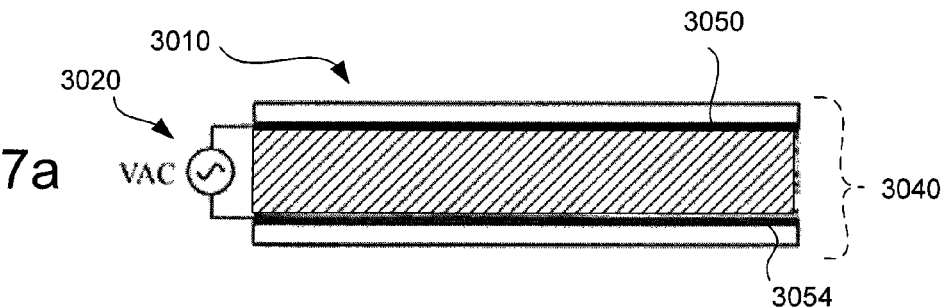
FIG. 7a is a schematic side view of an exemplary variable lens.

With regard to liquid crystal lenses, FIG. 7A illustrates an exemplary adaptive modal liquid crystal lens 3010 that has variable focus and is controllable with low power electronics 3020, has numerous applications in optical telecommunications devices, 2D display systems, miniature cameras and adaptive optics.

Figure 7B:
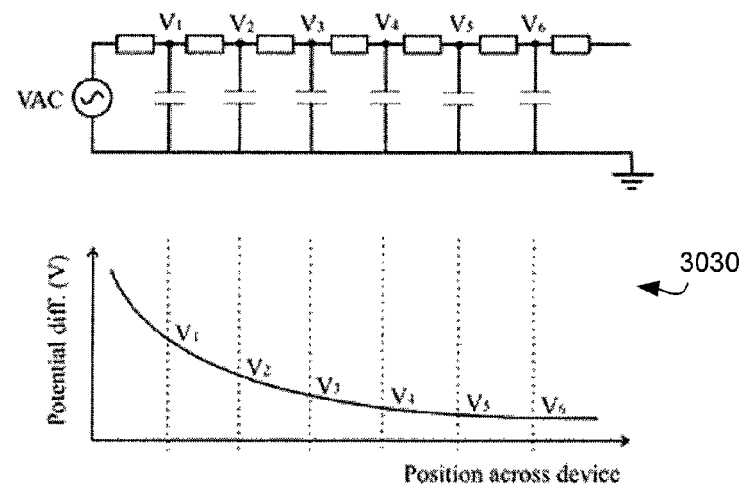
FIG. 7b is a electric schematic diagram and graph of an exemplary variable lens.

Consider a simple liquid crystal cell, with two electrodes sandwiching the liquid crystal within the centre cell. It is driven with a sinusoidal potential, and the orientation of liquid crystal molecules responds to the corresponding root-mean-square voltage (Vrms) that is applied. The liquid crystal sandwiched between the two electrodes can be considered to be similar to a small capacitor (combined with a very small parasitic parallel conductance, due to dielectric losses within the medium). We now replace one of the two electrodes with a material of higher resistivity connected to the driving potential at only one end, as shown in FIG. 7B. The resistance of this layer, combined with the reactive (capacitive) impedance of the liquid crystal enables the equivalent circuit of the device to be modeled by a series of cascaded RC filters, analogous to an electrical transmission line. The potential difference between the two electrodes, 3030, therefore decreases as a function of distance across the device. The exact shape of the curve will depend upon the frequency and voltage of the applied potential, with higher frequencies generating sharper curves.

Figure 7C:
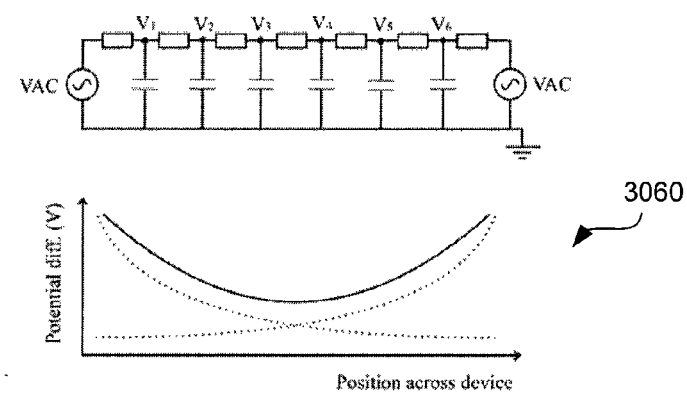
FIG. 7c is a electric schematic diagram and graph of an exemplary variable lens.
Figure 10:
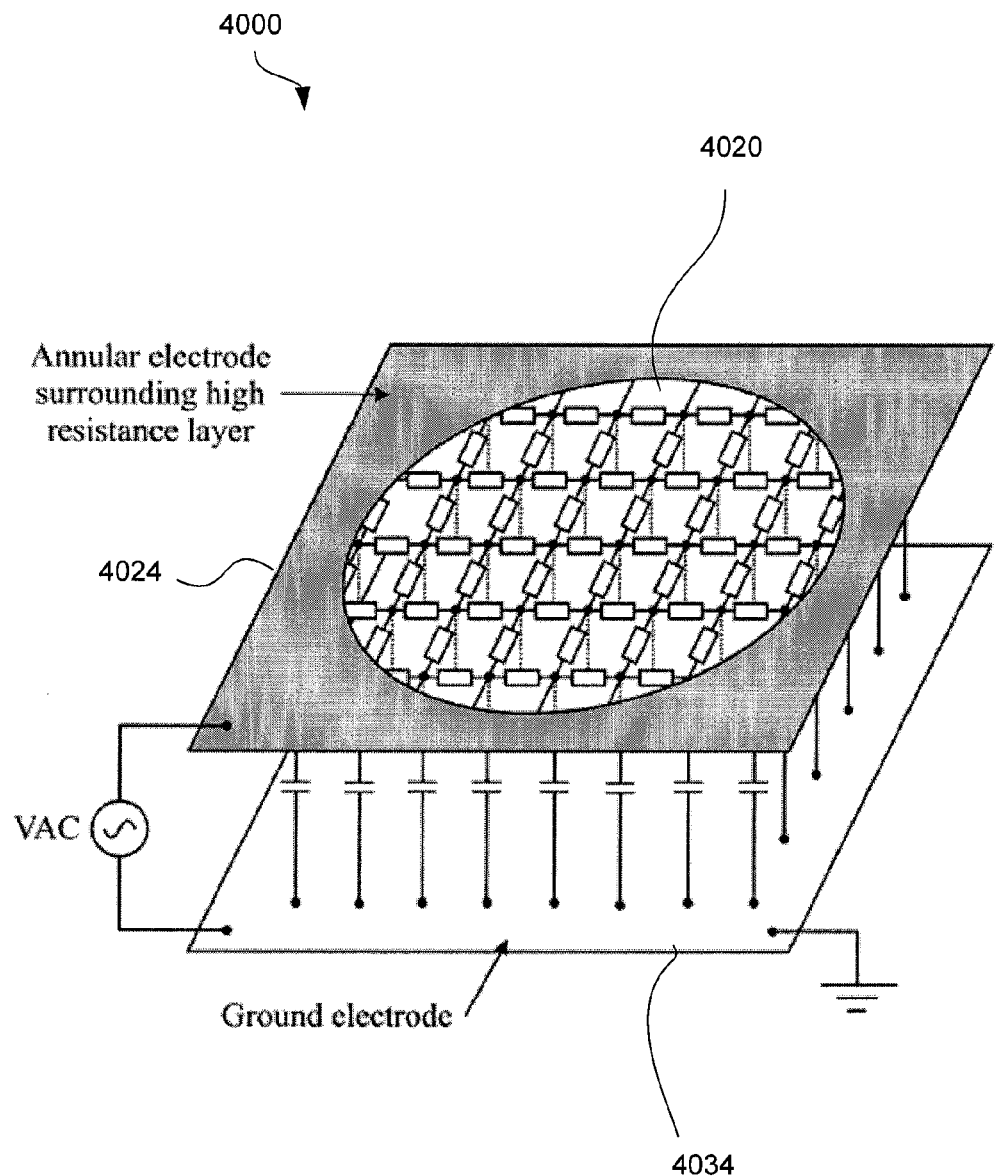
FIG. 10 is a schematic diagram for a module liquid crystal lens.

If both ends of the high resistance electrode are connected to the same driving voltage as shown in FIG. 7C, then the resultant potential, 3060, across the device resembles a quasi-parabolic shape. The exact shape of the function is, in general, non-parabolic. However, careful control of the applied voltage and frequency can give a quasi-parabolic phase profile, similar to that required to generate a cylindrical lens. If we extend this idea further, into an extra dimension (see lens 4000 of FIG. 10), and connect the high resistance layer 4020 to the driving potential using an annular electrode 4024, then the result is a bowl-shaped electrical potential.

Figure 8:
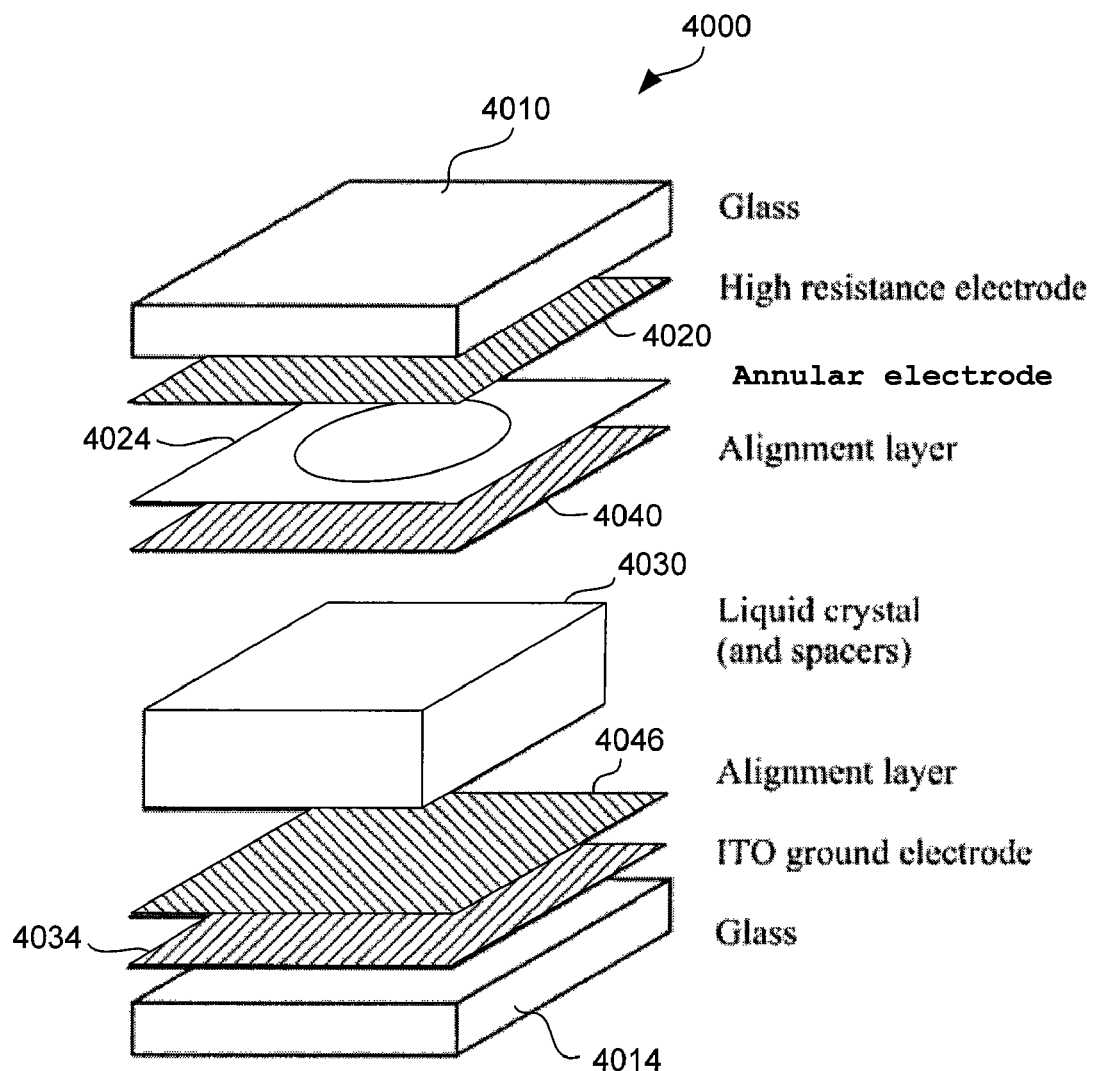
FIG. 8 is a schematic exploded plan view of an exemplary variable lens.

An illustrative example of such a liquid crystal lens is shown in FIG. 8, and consists of several thin layers sandwiched between two glass substrates. On the upper side there is a transparent high resistance (0.1 to 1 MΩ/(per square area) electrode 4020 with an annular metallic contact 4024. On the opposite side of the liquid crystal cell is the low resistance (1 to 10Ω/(per square area) ground electrode 4034, also transparent, made from ITO. The two substrates are held apart by spacers (not explicitly shown) to provide a uniform separation into which liquid crystal is filled. Thin polymer alignment layers 4040 and 4046 provide the liquid crystal molecules 4030 with a direction with which to align whilst zero field is applied across the device. The entire device is contained between the two glass windows 4010 and 4014.

A spatially varying and circularly symmetric voltage profile 3060 may be generated across a liquid crystal cell 4000, generating a lens-like refractive index profile. Such devices are simple in design, and do not require a pixilated structure. The shape and focusing power of the lens may be controlled by the variation of applied electric field and frequency to provide a small and lightweight variable focus lens with rapidly changing and electronically controllable focal lengths.

Figure 9:
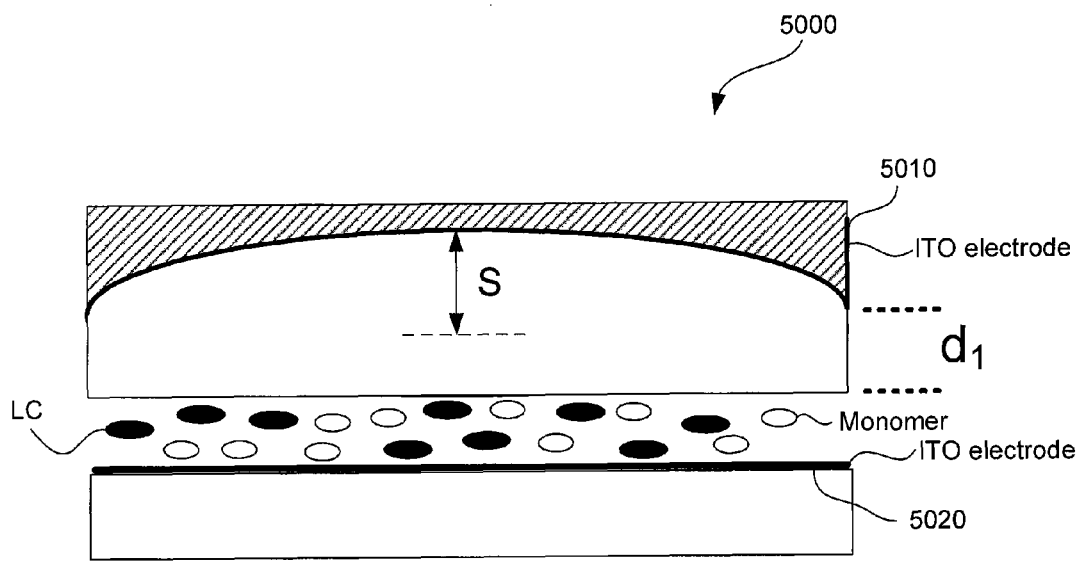
FIG. 9 is a schematic side view of an exemplary variable lens.

Exemplary LC lens 5000 is a cell with a homogeneous gap, is shown in FIG. 9. The cell is composed of a flat lens and an empty cell. The fabrication method of the cell is similar to that of a spherical lens. An ITO electrode 5010 embedded in the upper substrate is designed to be spherical instead of planar. To prepare the LC cell, an exemplary plano concave glass lens may be utilized (refractive index ng). The concave surface of the lens may be coated with a thin ITO electrode. The sag, S, may be filled with a UV curable prepolymer (refractive index np). After UV exposure, the prepolymer becomes fully polymerized and a planar surface may be obtained. Select the glass and prepolymer such that $n_g > n_p$, then the planar lens has an initial focal length f. The planar lens may be then combined with an empty LC cell. The glass substrate which is in contact with the lens may have a distance $d_1$. The inner surfaces of the LC cell may be coated with a thin polyimide layer and rubbed in antiparallel directions. The cell gap may be controlled, on the order of 25 micrometer, and the liquid crystal monomer mixture may be injected into the empty cell at room temperature and the filling hole may be sealed using silicon glue.

An exemplary lens 5000 is an adaptive lens using electrically induced liquid crystal (LC)/monomer concentration redistribution. In the absence of an electric field, the LC/monomer mixture is homogeneously distributed. Application of an inhomogeneous electric field causes the LC molecules to diffuse towards the high field region and the liquid monomer towards the low field region. On the other hand, the LC molecules tend to diffuse from high to low concentration direction in order to balance the concentration change. A gradient LC concentration is thus obtained. Using the gradient LC concentration provides a tunable focus lens.

As the voltage across the ITO electrodes 5010, 5020 is applied, the electric field across the lens cell is centrosymmetric. The electric field in the middle is weaker than that at the edges. As a result, the LC molecules are driven toward the edges and monomers are diffused toward the center. Because the electric filed is inhomogeneous, the LC concentration from edges to center has a gradient distribution. Higher LC concentration presents a higher refractive index, and higher monomer concentration presents a lower refractive index. Therefore, the device functions as a negative lens. At a lower voltage, the lens cell presents a more convergent focus which causes the focal length to become less negative.

Compared with other tunable LC lens, the exemplary LC lens works based on LC concentration redistribution, not molecular reorientation. Therefore, the lens astigmatism may be reduced significantly. In the meantime, there is no distortion or light scattering during focus change. Based on this operation mechanism, a polarization independent lens may be fabricated by using two isotropic materials but with different dielectric constants and refractive indices.

Figure 11:
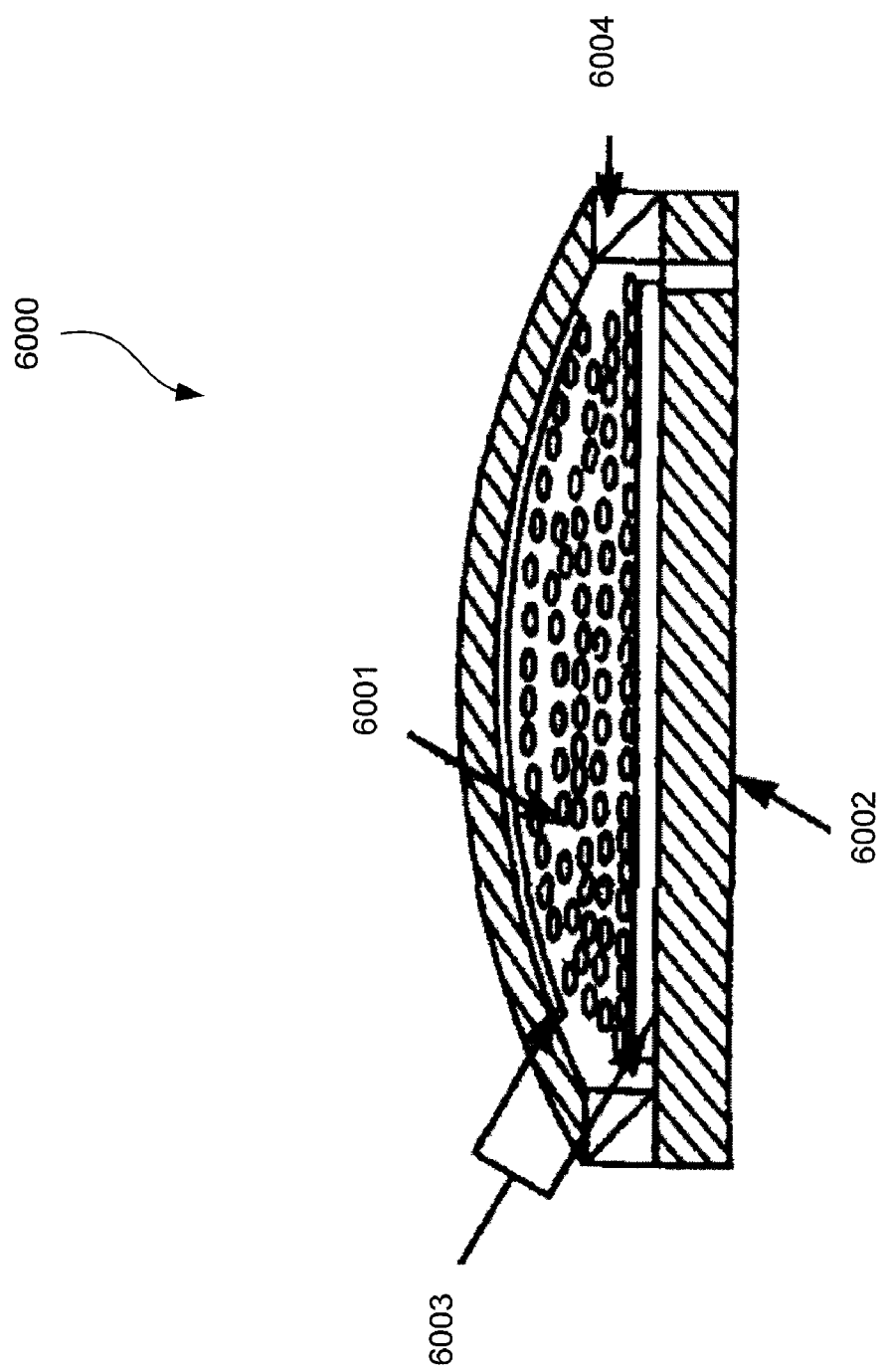
FIG. 11 is a schematic side view of an exemplary variable lens.

FIG. 11 illustrates an exemplary liquid crystal lens 6000 comprising a liquid crystal film 6001, lens cell 6002, electrodes 6003 to induce a field and spacer 6004. Lens 6000 has a variable refractive index due to changes in the field applied. The liquid crystal film is contained between non-planar electrodes 6003. The nematic material changes dielectric anisotropy sign with the frequency of the field. These materials have an anisotropy, which is positive at any field frequency f below a reference frequency T. Above f, their anisotropy becomes negative. An electrically switchable lens comprising a lens with a gradient index through its aperture is provided. The gradient of index may be obtained by changing the polarity in one of the electrodes used.

Exemplary embodiments have been described herein both in general terms and by use of a necessarily limited number of more specific examples. However, this invention may be embodied in various forms and should not be construed as limited to the embodiments set forth herein. Rather, these representative embodiments are described in detail so that this disclosure will fully convey the scope, structure, operation, functionality, and potential of applicability of the invention to those skilled in the art.

The invention claimed is:

1. A cell phone comprising:
a device for wireless communication;
a photosensor for capturing an image;
a battery for powering the cell phone;
an electrowetting fluid lens for focusing on images using fluids wherein the fluids touch at an interface;
a control system for altering the shape of the interface to adjust an entrance optical axis angle or direction relative to the fluid lens, the control system having:
at least two electrodes;
a controller to generate control signals applied to the electrodes;
a sensor to influence the control signals to compensate for movement of the cell phone;
wherein the electrowetting fluid lens is a polarization independent lens is fabricated using two isotropic materials with different dielectric constants and refractive indices.

2. A cell phone in accordance with claim 1, wherein the sensor comprises at least one of the following: a rotation sensor; an angular sensor and an inertial sensor.

3. A cell phone in accordance with claim 1, wherein the sensor comprises at least one of the following: a rotation rate sensor; an angular velocity sensor; and a quartz inertial sensor.

4. A cell phone in accordance with claim 1, further comprising a processing module configured to extract information encoded by an encoded indicium.

5. A cell phone comprising:
a device for wireless communication; a photosensor for capturing an image;
a battery for powering the cell phone;
an adaptive liquid crystal lens;
a control system for acting on the liquid crystal in the adaptive liquid crystal lens to change the focal length of the adaptive liquid crystal lens;
a sensor to influence the control system to compensate for movement of the cell phone;
wherein the electrowetting fluid lens is a polarization independent lens is fabricated using two isotropic materials with different dielectric constants and refractive indices.

6. A cell phone in accordance with claim 5, further comprising a sensor to influence the control system to compensate for movement of the cell phone wherein the sensor comprises at least one of the following: a rotation sensor; an angular sensor and an inertial sensor.

7. A cell phone in accordance with claim 5, wherein the sensor control system comprises non-planar electrodes.

8. A cell phone in accordance with claim 5, further comprising a processing module configured to extract information encoded by an encoded indicium.

9. A cell phone comprising:
a device for wireless communication;
a battery for powering the cell phone;
an imager for capturing an image;
a variable lens system for focusing the image onto the imager, the variable lens system having a lens and at least two electrodes;
a control system for altering an entrance optical axis angle or direction relative to the lens
wherein the control system applies control signals to the at least two electrodes;
a sensor to influence the control system to compensate for movement of the cell phone;
wherein the electrowetting fluid lens is a polarization independent lens is fabricated using two isotropic materials with different dielectric constants and refractive indices.

10. A cell phone in accordance with claim 9, wherein the variable lens system comprises an electrowetting fluid element wherein at least two fluids touch at a fluid to fluid interface.

11. A cell phone in accordance with claim 9, wherein the sensor comprises at least one of the following: a rotation sensor; an angular sensor and an inertial sensor.

12. A cell phone in accordance with claim 9, wherein the sensor comprises at least one of the following: a rotation rate sensor; an angular velocity sensor; and a quartz inertial sensor.

13. A cell phone in accordance with claim 9, further comprising a processing module configured to extract information encoded by an encoded indicium.

14. A cell phone comprising:
a device for wireless communication;
an imager sensor for capturing an image of an object;
a lens system for projecting an image of the object onto the imager;
a battery for powering the cell phone;
a lens system for focusing images of the object onto the imager comprising:
a focus element;
at least two electrodes associated with the focus element;
a control system to adjust the state of focus of the focus element by controlling the at least two electrodes;
wherein the electrowetting fluid lens is a polarization independent lens is fabricated using two isotropic materials with different dielectric constants and refractive indices.

15. A cell phone in accordance with claim 14, wherein the focus element comprises a liquid crystal variable focus lens.

16. A cell phone in accordance with claim 14, wherein the focus element comprises an electrowetting fluid element using at least two fluids touching at a fluid to fluid interface.

17. A cell phone in accordance with claim 14, further comprising a processing module configured to extract information encoded by an encoded indicium.

18. A cell phone in accordance with claim 14, further comprising a sensor to influence the control system to compensate for movement of the cell phone.

19. A cell phone in accordance with claim 18, wherein the sensor comprises at least one of the following: a rotation sensor; an angular sensor and an inertial sensor.

20. A cell phone in accordance with claim 19, further comprising a processing module configured to extract information encoded by an encoded indicium.

\* \* \* \* \*